Patented Nov. 22, 1938

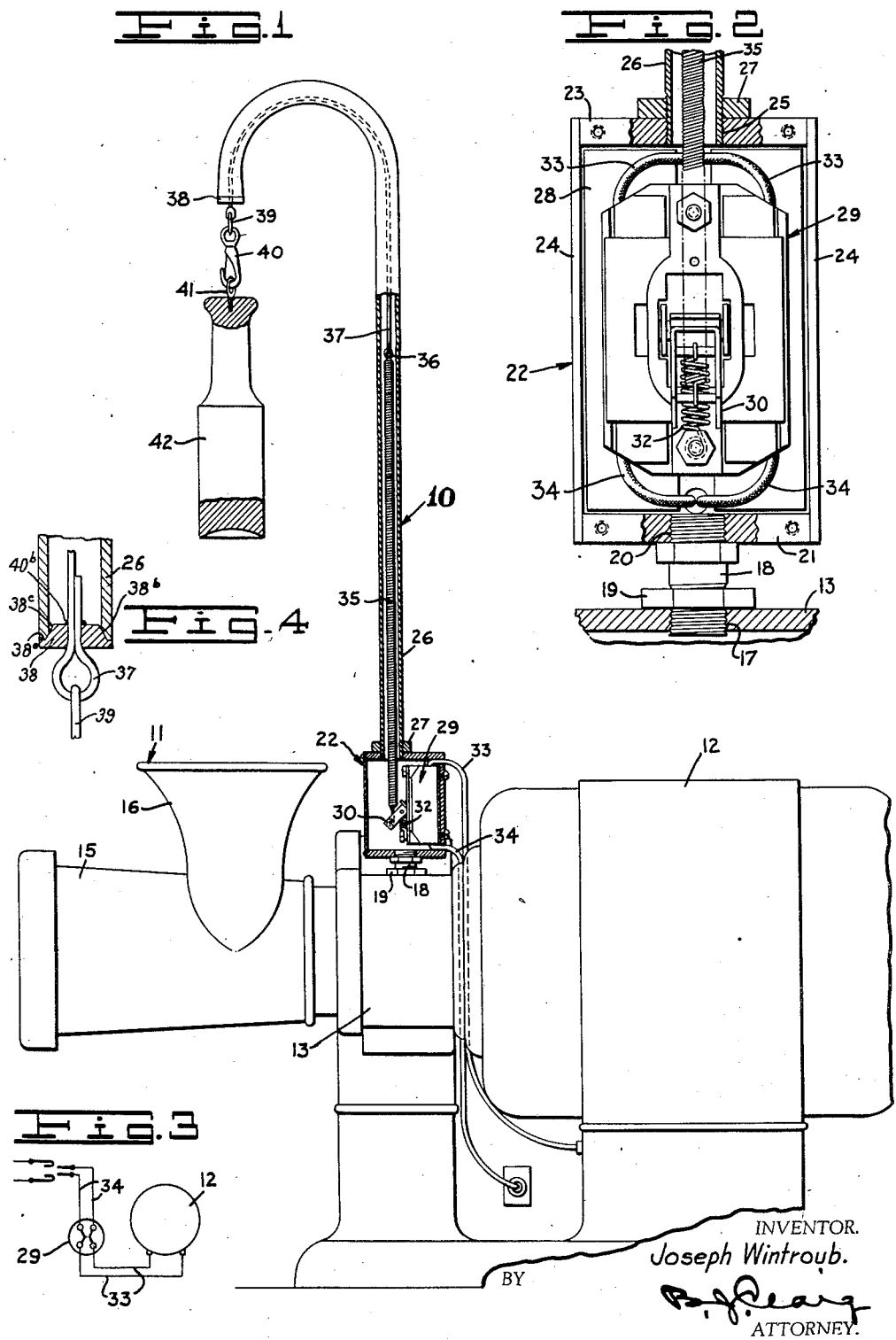

2,137,709

UNITED STATES PATENT OFFICE 2,137,709

MEAT STOMPER

Joseph Wintroub, Burbank, Calif.

Application June 21, 1937, Serial No. 149,371

1 Claim. (Cl. 146—182)

This invention relates to meat stompers.

The general object of the invention is to provide a meat stomper wherein the operating switch is supported in a novel manner.

A more specific object of the invention is to provide a grinding machine having a meat stomper mounted thereon in a novel manner.

Another object of the invention is to provide a meat grinding machine including a novel combined support and switch housing.

Other objects and the advantages of my invention will be apparent from the following description taken in connection with the accompanying drawing, wherein:

Fig. 1 is a side elevation, partly in section, showing my improved stomper;

Fig. 2 is a fragmentary, central, sectional view through the supporting housing;

Fig. 3 is a wiring diagram; and

Fig. 4 is a sectional detail.

Referring to the drawing by reference characters I have indicated my improved meat stomper generally at 10. In the accompanying drawing I have shown the meat stomper 10 mounted on a meat grinder which is indicated at 11 and includes a motor housing 12 from which a sleeve 13 projects having thereon a grinding head 15 which includes a feed hopper 16.

My invention is an improvement on that shown in Rosenbaum Patent No. 2,084,359, granted June 22, 1937. As shown the sleeve 13 is threaded as at 17 to receive a threaded coupling member 18 which is held in place by a lock nut 19. The threaded coupling member 18 at the end remote from the sleeve 13 engages a threaded aperture 20 in the bottom 21 of a housing 22. This housing includes a top 23 and sides 24. The upper end of the housing is threaded as at 25 to receive a goose neck shaped tube 26 which is held in place by a lock nut 27.

Mounted within the housing 22 and against the back thereof I arrange an insulating plate which may be made of fiber or other suitable material and which is indicated at 28, and on this plate I arrange a switch 29. This switch member may be of any suitable snap switch type which will serve the intended purpose and includes a pivoted operating lever 30 which is normally held in off position by a spring 32.

One set of terminals of the switch 29 is connected by leads 33 to the motor 12, while the other side of the switch is connected by leads 34 with a suitable source of electrical energy. The construction is such that when the switch lever 30 is raised against the tension of the spring 32 the circuit will be completed to the motor so that the latter will operate to drive the meat grinder 11 in the well known manner.

The switch lever 30 is connected with the lower end of a spring 35 while the upper end of the spring 35 is connected as at 36 to a flexible cord or other member 37 which extends around the U-shaped portion and engages a closure 38.

The closure 38 includes a body having a flange 38a which engages the end of the tube 26. The inner end of the tube is slightly bevelled as at 38b and the closure 38 includes a bevelled portion 38c which fits within the bevelled portion 38b to form a seal and prevent material from entering the tube 26. The flexible member 38 passes through an eyelet 39 on a harness buckle 40. The end of the flexible member is looped through this eyelet 39 and bent back upon itself so that it passes through the closure 38a and is secured in the closure as by solder at 40b. The harness buckle or snap 40 engages an eye 41 on a meat stomper 42 which as shown in Fig. 1 is disposed above the hopper 16.

In the assembly of my device the sleeve 18 is secured in the threaded aperture 17 to support the meat stomper 42 above the hopper. When the operator desires to use the meat grinder he grasps the stomper 42 pulling it towards the hopper 16 thus pulling the flexible member 37 and tensioning the spring 35. This pulling operation is continued and the relation of the spring 35 to the spring 32 is such that just before the stomper enters the hopper 16 the tension will overcome tension of the spring 32 causing the circuit closer 30 to snap to circuit closing position so that current is supplied to the motor.

As soon as the stomper 42 is released it moves of its own accord to the position shown in Fig. 2 and the motor ceases operation.

From the foregoing description it will be apparent that I have invented a novel meat stomper which can be economically manufactured and which is highly efficient in use.

Having thus described my invention I claim:

In a meat grinder, a housing having a sleeve thereon and having a feed hopper, said sleeve having a threaded aperture, a coupling threaded in said aperture, a lock nut on said coupling and engaging said sleeve, a switch housing having a bottom with a threaded aperture therein, said coupling threadedly engaging said bottom aperture, said switch housing including sides and a top, an insulating plate mounted on one side of the housing, a switch mounted on said insulating plate, said switch including an operating lever, spring means to normally hold said lever in off position, the top of said housing having a threaded aperture, a goose neck shaped tube threaded in said top aperture, a spring in said tube, the lower end of said spring engaging said lever, a cable engaging the upper end of said spring, a closure for the free end of said tube, said closure being mounted on said cable and a meat stomper mounted on said cable.

JOSEPH WINTROUB.